(12) United States Patent
Ueno et al.

(10) Patent No.: US 8,970,347 B2
(45) Date of Patent: Mar. 3, 2015

(54) HUMAN BODY COMMUNICATION APPARATUS AND AUTHENTICATION METHOD OF THE SAME

(75) Inventors: Takashi Ueno, Kanagawa-ken (JP);
Takafumi Ohishi, Kanagawa-ken (JP);
Shuichi Obayashi, Kanagawa-ken (JP);
Ichiro Seto, Tokyo (JP); Toshitada Saito, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1020 days.

(21) Appl. No.: 13/051,190

(22) Filed: Mar. 18, 2011

(65) Prior Publication Data
US 2012/0126944 A1    May 24, 2012

(30) Foreign Application Priority Data
Nov. 22, 2010 (JP) ................ P2010-259764

(51) Int. Cl.
*G05B 19/00* (2006.01)
*G07C 9/00* (2006.01)

(52) U.S. Cl.
CPC .. *G07C 9/00158* (2013.01); *G07C 2009/00809* (2013.01)
USPC ........................................ 340/5.82

(58) Field of Classification Search
CPC . G06F 21/32; G07C 9/00087; G07C 9/00158
USPC .................. 340/10.1, 5.1, 5.8, 5.82
See application file for complete search history.

(56) References Cited

U.S. PATENT DOCUMENTS

| | | | |
|---|---|---|---|
| 6,771,161 B1* | 8/2004 | Doi et al. | 340/5.64 |
| 2009/0009284 A1* | 1/2009 | Sako | 340/5.82 |
| 2010/0103093 A1* | 4/2010 | Izumi | 345/156 |
| 2011/0221590 A1* | 9/2011 | Baker et al. | 340/539.12 |
| 2012/0101358 A1* | 4/2012 | Boettcher et al. | 600/384 |

FOREIGN PATENT DOCUMENTS

| | | |
|---|---|---|
| JP | 2004-126698 | 4/2004 |
| JP | 2009-266234 | 11/2009 |

* cited by examiner

*Primary Examiner* — Jennifer Mehmood
*Assistant Examiner* — Yong Hang Jiang
(74) *Attorney, Agent, or Firm* — White & Case LLP

(57) ABSTRACT

In one embodiment, a human body communication apparatus includes a first human body communication terminal carried by a person, a second human body communication terminal and an authentication unit included in the first or second human body communication terminal. The first human body communication terminal includes a first detection unit to detect first living body physiological information of the carrying person. The second human body communication terminal includes a human body contact sensor and a second detection unit to detect second living body physiological information of the person who touches the human body contact sensor. The authentication unit acquires the first and second living body physiological information and determines a correlation between the first and second living body physiological information to permit communication between the first and second human body communication terminals in accordance with the correlation.

19 Claims, 14 Drawing Sheets

HUMAN BODY COMMUNICATION APPARATUS AND AUTHENTICATION METHOD OF THE SAME

CROSS REFERENCE TO RELATED APPLICATION

This application is based upon and claims the benefit of priority from the prior Japanese Patent Application No. 2010-259764, filed on Nov. 22, 2010, the entire contents of which are incorporated herein by reference.

FIELD

Embodiments described herein relate generally to a human body communication apparatus and authentication method of the human body communication apparatus.

BACKGROUND

In a kind of human body communication that transmits/receives data by using a human body as a communication path, when a person carrying a human body communication mobile terminal touches a human body contact sensor provided in a human body communication terminal of the other party, data communication is performed between the human body communication mobile terminal and the human body communication terminal.

However, there is a case where data communication is performed between the human body communication mobile terminal and the human body communication terminal via another person touching the human body contact sensor even if the person himself carrying the human body communication mobile terminal has no intention to perform communication. Cases shown below, for example, are such a case.

When another person carrying no human body communication mobile terminal touches a human body contact sensor, data communication is performed between a human body communication mobile terminal and a human body communication terminal via the other person touching the human body contact sensor.

When another person carrying a human body communication mobile terminal touches a human body contact sensor, the human body communication mobile terminal of the other person touching the human body contact sensor is passed and data communication is performed between a human body communication mobile terminal of the person himself and a human body communication terminal via the other person.

Data communication not intended by the person himself carrying a human body communication mobile terminal could cause a security problem.

To ensure security, personal authentication data such as a fingerprint pattern is normally registered with a human body communication mobile terminal in advance and the identity of a person touching the human body contact sensor is authenticated by comparing with the fingerprint pattern of the person touching the human body contact sensor.

However, registering personal authentication data with a human body communication mobile terminal in advance could cause a problem in terms of personal information management. If a human body communication mobile terminal is lost, personal authentication data could be misused.

Thus, When a human body communication mobile terminal is shared by a plurality of persons, it becomes difficult to register personal authentication data with the human body communication mobile terminal in advance and therefore, instead of authenticating personal identification, a human body communication apparatus and an authentication method capable of authenticating a communication intention of the person himself carrying a human body communication mobile terminal are desired.

DETAILED DESCRIPTION

Figure 1:
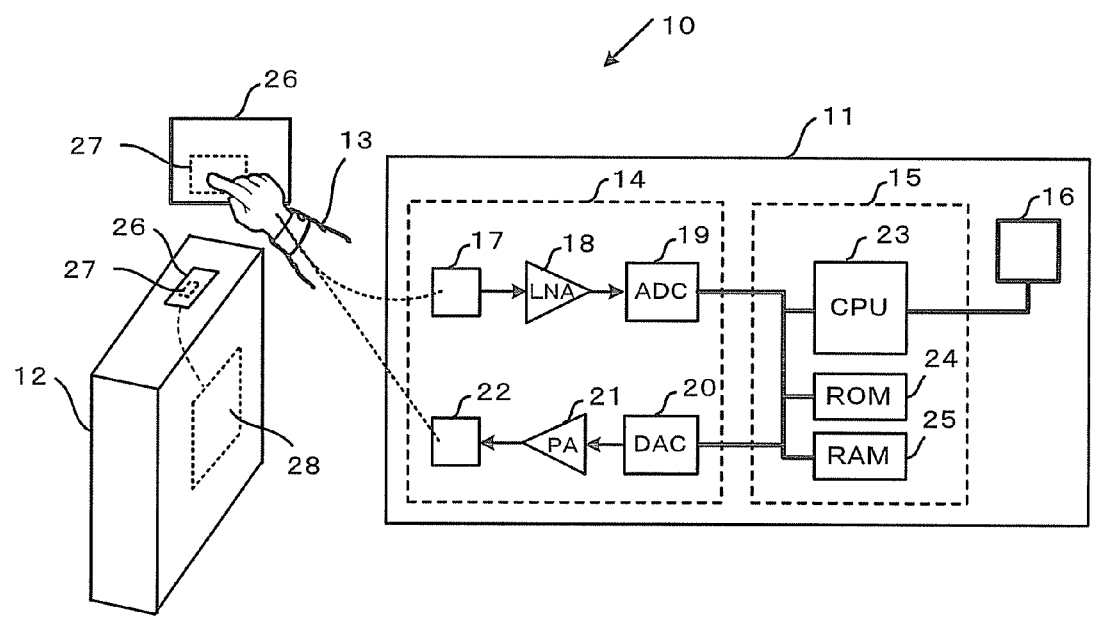
FIG. 1 is a block diagram showing a human body communication apparatus according to a first embodiment.

In one embodiment, a human body communication apparatus includes a first human body communication terminal carried by a person, a second human body communication terminal and an authentication unit included in the first or second human body communication terminal. The first human body communication terminal includes a first detection unit to detect first living body physiological information of the carrying person. The second human body communication terminal includes a human body contact sensor and a second detection unit to detect second living body physiological information of the person who touches the human body contact sensor. The authentication unit acquires the first and second living body physiological information and determines a correlation between the first and second living body physiological information to permit communication between the first and second human body communication terminals in accordance with the correlation.

Hereinafter, further embodiments will be described with reference to the drawings. In the drawings, same reference characters denote the same or similar portions.

[First Embodiment]

Figure 2:
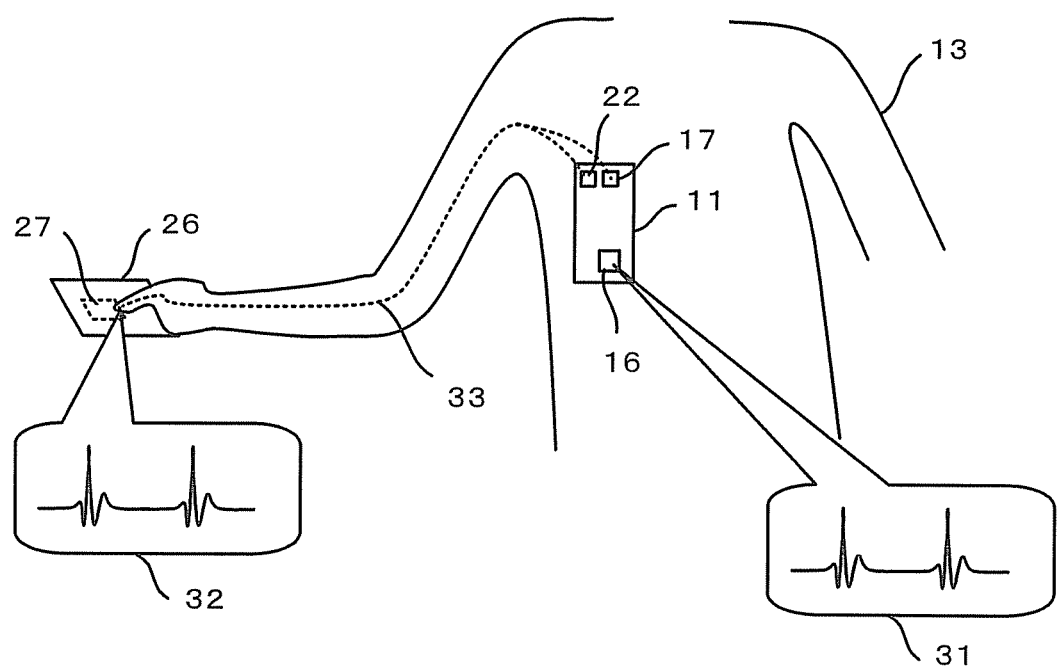
FIG. 2 is a figure for explaining the human body communication apparatus according to the first embodiment.

A first embodiment will be described with reference to FIGS. 1 and 2. FIG. 1 is a block diagram showing a human body communication apparatus of the first embodiment and FIG. 2 is a figure for explaining the human body communication apparatus.

As shown in FIG. 1, a human body communication apparatus 10 of the first embodiment includes a mobile first human body communication terminal 11 carried by a person and a floor-mounted second human body communication terminal 12 installed in a predetermined location.

The first human body communication terminal 11 and the second human body communication terminal 12 perform data communication by transmitting/receiving a phase-modulated analog signal, for example, after a person 13 (hereinafter, referred to simply as a carrier 13) carrying the first human body communication terminal 11 touches a human body contact sensor provided in the second human body communication terminal 12 by using the carrier 13 as a communication path. The frequency of the analog signal used for human body communication (human body communication signal) is substantially between 1 MHz and 10 MHz.

The first human body communication terminal 11 includes an analog front-end unit 14 to transmit/receive an analog signal, a signal processing unit 15 that processes a signal transmitted/received by the analog front-end unit 14, and a first sensor 16 (first detection unit) to detect first living body physiological information of the carrier 13.

The analog front-end unit 14 includes a receiving unit that receives an analog signal and a transmitting unit that transmits the analog signal.

The receiving unit includes a receiving electrode 17 that receives an analog signal by contact with the carrier 13 or electrostatic coupling via clothing, a low-noise amplifier 18 that amplifies the received analog signal, and an analog/digital converter (hereinafter, referred to as an AD converter) 19 that converts the amplified analog signal into a digital signal and outputs the digital signal to the signal processing unit 15, for example.

The transmitting unit includes, a digital/analog converter (hereinafter, referred to as an DA converter) 20 that converts a digital signal from the signal processing unit 15 into an analog signal, a power amplifier 21 that amplifies the converted analog signal, and a transmitting electrode 22 that transmits the analog signal amplified by contact with the carrier 13 or electrostatic coupling via clothing, for example.

The signal processing unit 15 includes a CPU 23 that performs arithmetic processing, a RAM (random Access Memory) 25 that temporarily stores arithmetic processing results, and a ROM (Read Only Memory) 24 that stores programs of arithmetic processing procedures or the like, for example.

The second human body communication terminal 12 includes a human body contact sensor 26 that detects human body contact and a second sensor (second detection unit) to detect second living body physiological information of a person (hereinafter, referred to simply as a human body contactor) in contact with the human body contact sensor 26 in the form of being contained in the human body contact sensor 26.

The second human body communication terminal 12 includes a signal processing unit 28 that processes the second living body physiological information from the second sensor 27 and, like the first human body communication terminal 11, the analog front-end unit 14 to transmit/receive an analog signal and the signal processing unit 15 that processes a signal transmitted/received by the analog front-end unit 14.

The first sensor 16 herein includes a function to amplify a detected signal and output a digital signal obtained by an AD conversion of the signal to the CPU 23, which also applies to the second sensor 27.

As shown in FIG. 2, the first sensor 16 is a sensor that detects a vibration, for example, caused by pulsation in the chest as first living body physiological information 31 of the carrier 13 and converts a continuous pulsation waveform in a fixed period into an electric signal.

The second sensor 27 is a sensor that detects a change in optical transmittance caused by a contact site pulsation at a fingertip, for example, as second living body physiological information 32 of a human body contactor and converts, like the first living body physiological information 31, a continuous pulsation waveform in a fixed period into an electric signal.

The second human body communication terminal 12 is provided with an authentication unit (not shown) that, when a correlation between the first and second living body physiological information 31, 32 is established after the first living body physiological information 31 is obtained from the first human body communication terminal 11 via a human body communication path 33, the correlation between the first and second living body physiological information 31, 32 is determined, permits communication between the first and second human body communication terminals 11, 12.

The authentication unit is embodied by the signal processing unit 15, for example. The ROM 24 of the signal processing unit 15 has a program such as a procedure to determine a correlation between the first and second living body physiological information 31, 32 and conditions necessary to determine and judge whether there is any correlation therebetween stored therein.

The CPU 23 performs arithmetic processing to determine the correlation between the first and second living body physiological information 31, 32 according to the program stored in the ROM 24. An arithmetic result is stored in the RAM 25.

The above human body communication apparatus 10 is configured to verify that the carrier 13 is in contact with the human body contact sensor 26, that is, the carrier 13 and the human body contactor are one and the same person to authenticate a communication intention of the carrier 13.

Figure 3:
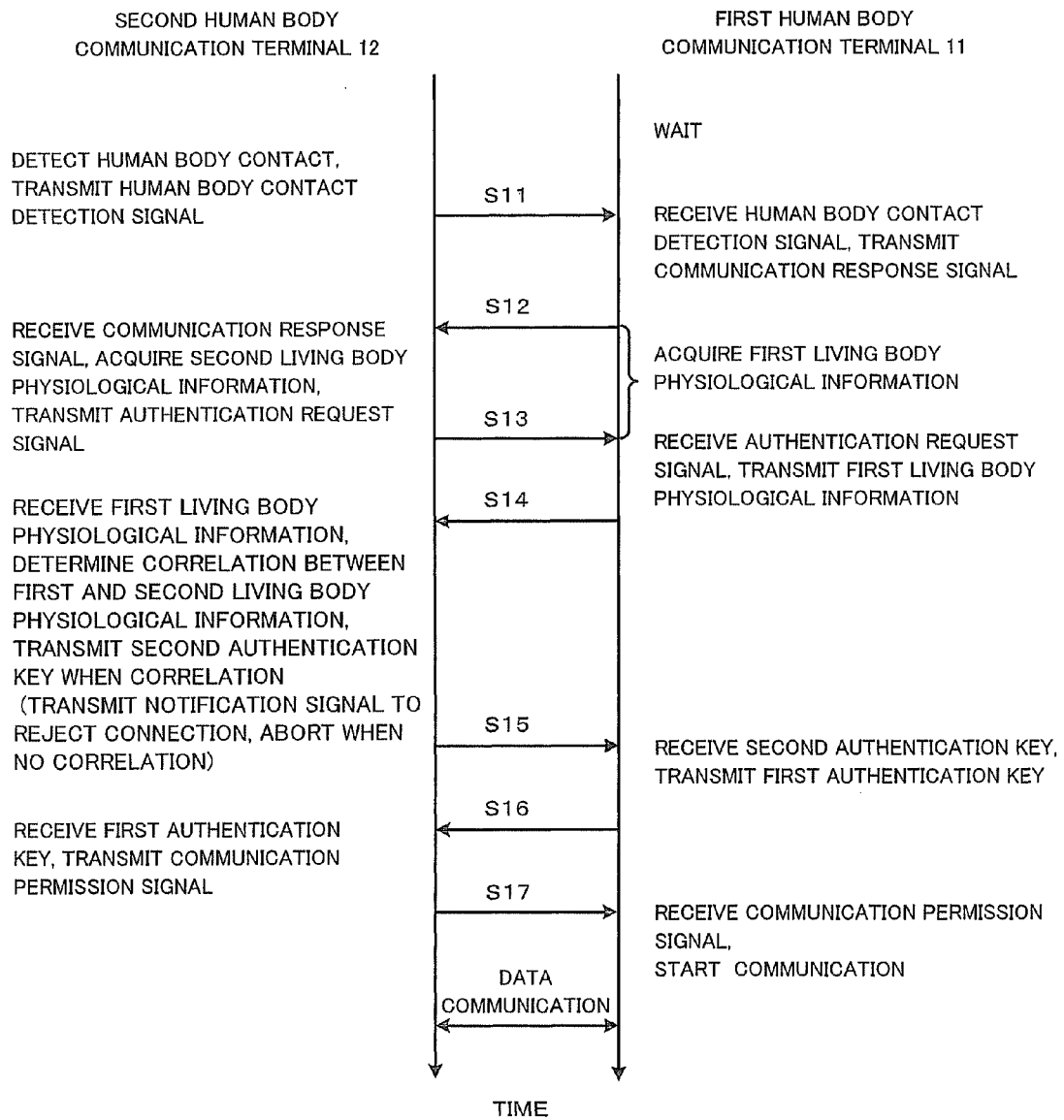
FIG. 3 is a diagram showing an authentication procedure of the human body communication apparatus according to the first embodiment.

Next, an authentication method of the communication intention of the carrier 13 will be described with reference to FIG. 3. FIG. 3 is a diagram showing the authentication procedures of the human body communication apparatus.

The first human body communication terminal 11 is first in a standby state by operating the receiving unit ranging from the receiving electrode 17 to the AD converter 19 until some communication signal arrives after the carrier 13 touches the human body contact sensor 26.

When human body contact with the human body contact sensor 26 is detected, the second human body communication terminal 12 transmits a human body contact detection signal (step S11).

When the human body contact detection signal is received, the first human body communication terminal 11 operates the transmitting unit ranging from the DA converter 20 to the transmitting electrode 22 to acquire the first living body physiological information 31 by transmitting a communication response signal indicating reception of a human body contact detection signal (step S12).

When the communication response signal is received, the second human body communication terminal 12 acquires the second living body physiological information 32 and requests transmission of the first living body physiological information 31 by transmitting an authentication request signal (step S13).

When the authentication request signal is received, the first human body communication terminal 11 transmits the first living body physiological information 31 (step S14).

When the first living body physiological information 31 is received, the second human body communication terminal 12 determines a correlation between the first living body physiological information 31 and the second living body physiological information 32 by a method described later to determine whether there is any correlation between the first living body physiological information 31 and the second living body physiological information 32 and, when there is a correlation therebetween, the second human body communication terminal 12 transmits a second authentication key to exchange authentication keys (step S15).

When the second authentication key is received, the first human body communication terminal 11 transmits a first authentication key (step S16).

When the first authentication key is received, the exchange of the authentication keys is completed and the second human body communication terminal 12 transmits a communication permission signal (step S17).

With the reception of the communication permission signal by the first human body communication terminal 11, the authentication is completed. Hereinafter, data communication can freely be performed between the first and second human body communication terminals 11, 12 through human body communication using the carrier 13 as a communication path.

On the other hand, if there is no correlation between the first living body physiological information 31 and the second living body physiological information 32, the second human body communication terminal 12 transmits a notification signal to reject a connection and interrupts the communication. As a result, data communication cannot be performed between the first and second human body communication terminals 11, 12.

The correlation between the first living body physiological information 31 and the second living body physiological information 32 is determined by a method of searching for synchronization points of the first and second living body physiological information 31, 32, for example. The method is a method by which a point where the magnitude of waveform shifts at each sampling point is minimum as a whole is searched for, for example, a point where the sum of squares of differences between the first and second living body physiological information 31, 32 is at the minimum by comparing both waveforms while gradually shifting the time axis.

Whether there is any correlation is determined based on the magnitude of waveform shifts. If the first and second living body physiological information 31, 32 match perfectly, the magnitude of waveform shifts becomes 0.

In accordance with the method, waveforms without periodicity or waveforms whose period is long can be compared relatively accurately without picking up data for one period.

When there is any correlation between the first living body physiological information 31 and the second living body physiological information 32, that the carrier 13 touches the human body contact sensor 26, that is, that the carrier 13 and the human body contactor are one and the same person is verified so that the communication intention of the carrier 13 can be authenticated.

The correlation between the first living body physiological information 31 and the second living body physiological information 32 herein is not necessarily expressed as a function mathematically and means an index to judge how close a similarity there is between two waveforms at a level that does not cause any practical problem.

The first living body physiological information 31 transmitted from the first human body communication terminal 11 is real-time data read by the first sensor 16, but if a signal waveform processing delay or the like is considered, the first living body physiological information 31 may be mismatched with the second living body physiological information 32 in a simple waveform comparison.

Figure 4:
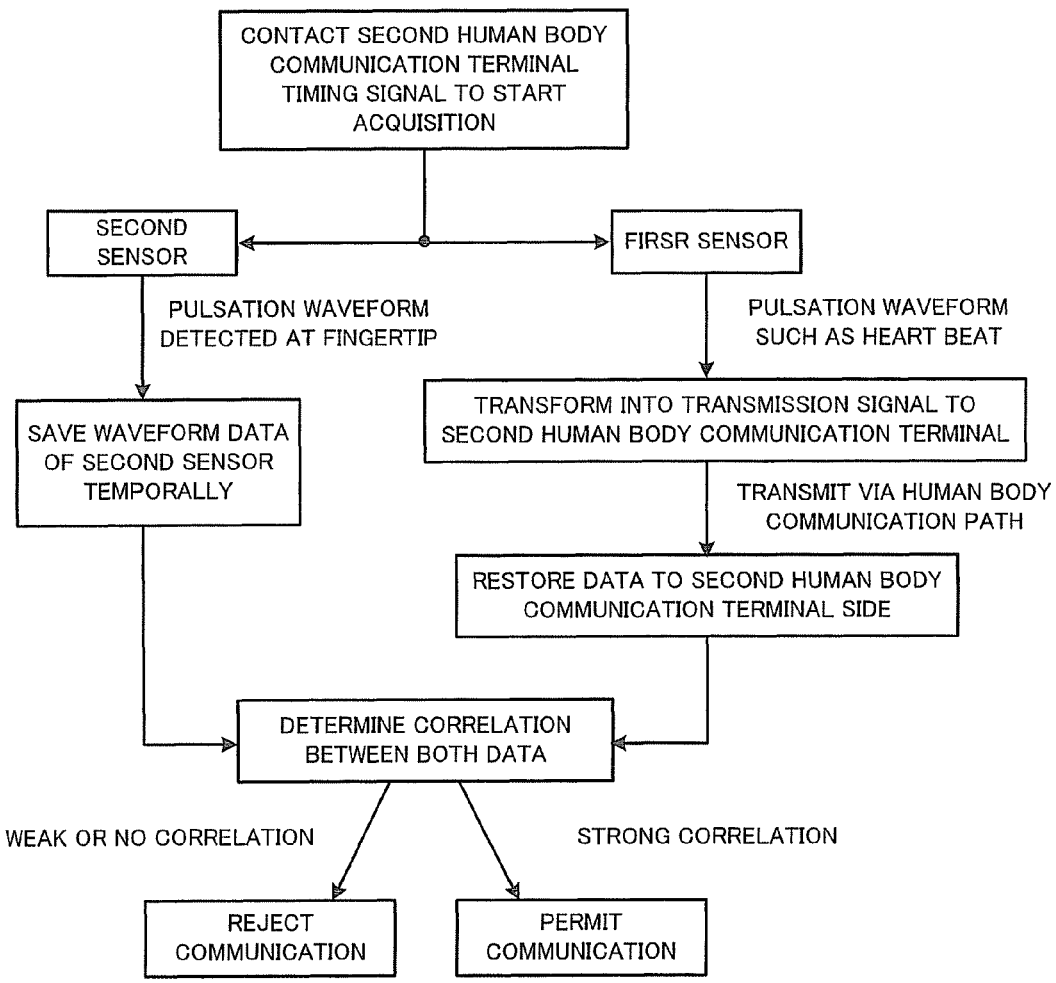
FIG. 4 is a diagram showing a process flow of the first and second living body physiological information according to the first embodiment.

FIG. 4 is a diagram showing a process flow of the first and second living body physiological information 31, 32 read by the first and second sensors 16, 27. As shown in FIG. 4, it is necessary to acquire the first and second living body physiological information 31, 32 in the same timing by the first and second sensors 16, 27 to search for synchronization timing for a waveform comparison.

The timing to start acquisition of the first and second living body physiological information 31, 32 is preferably a time when a person touches the human body contact sensor 26 and a communication response signal to a human body contact detection signal is output.

The first living body physiological information 31 acquired by the first human body communication terminal 11 side needs to be signal-converted and transmitted to the second human body communication terminal 12 side and thus, it is necessary to temporarily store the second living body physiological information 32 acquired by the second human body communication terminal 12 side.

A waveform comparison is made after the first and second living body physiological information 31, 32 become complete on the second human body communication terminal 12 side, but noise mixing and differences in waveform of fine portions are present and therefore, it is desirable to use an error correction technique or the like for correlation output to make a more accurate judgment.

Figure 5:
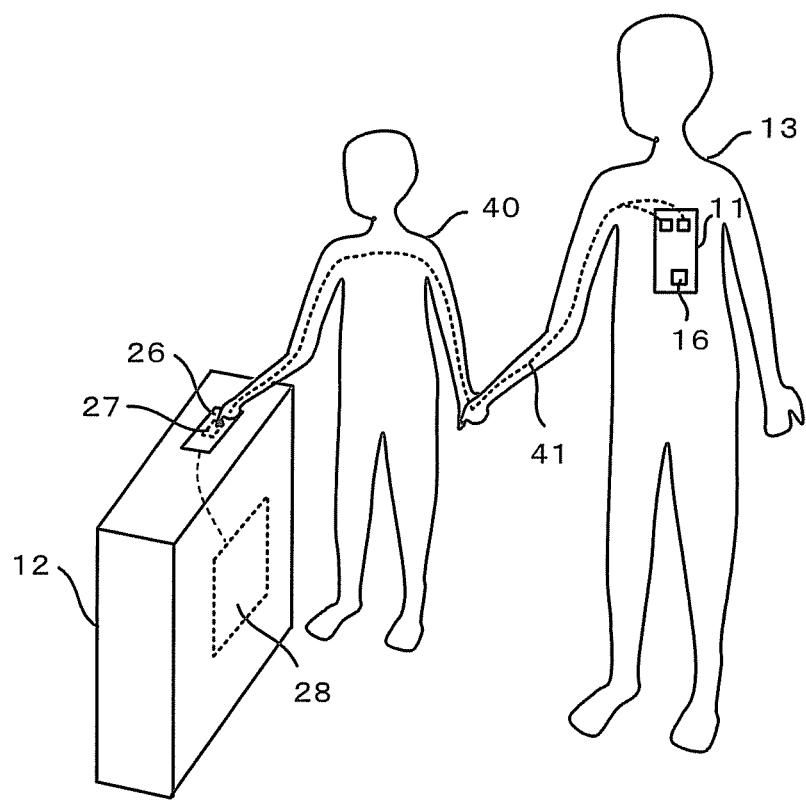
FIGS. 5 to 7 are figures showing cases where there is no correlation between the first and second living body physiological information according to the first embodiment.
Figure 6:
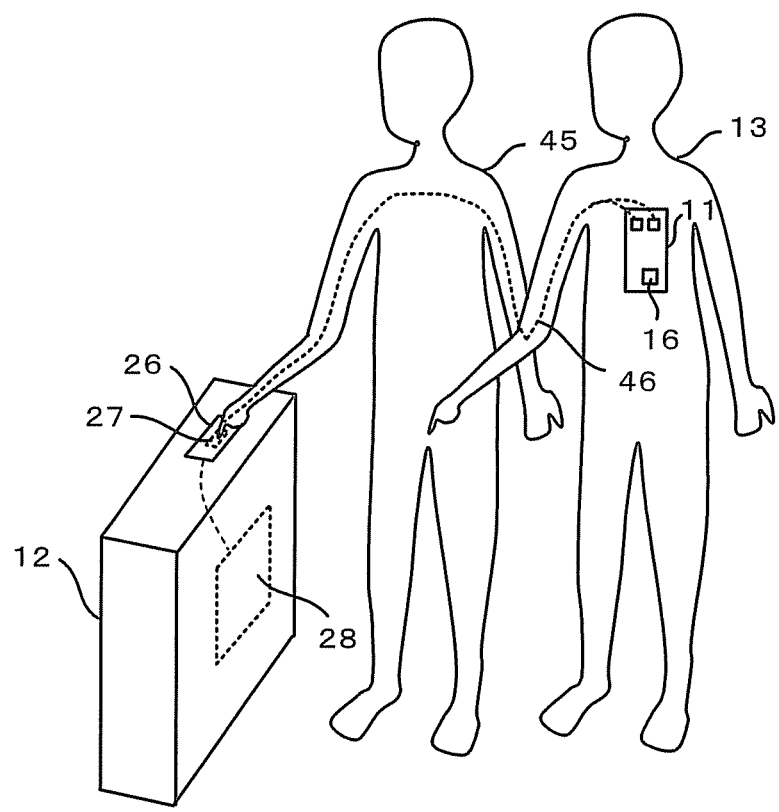
Figure 7:
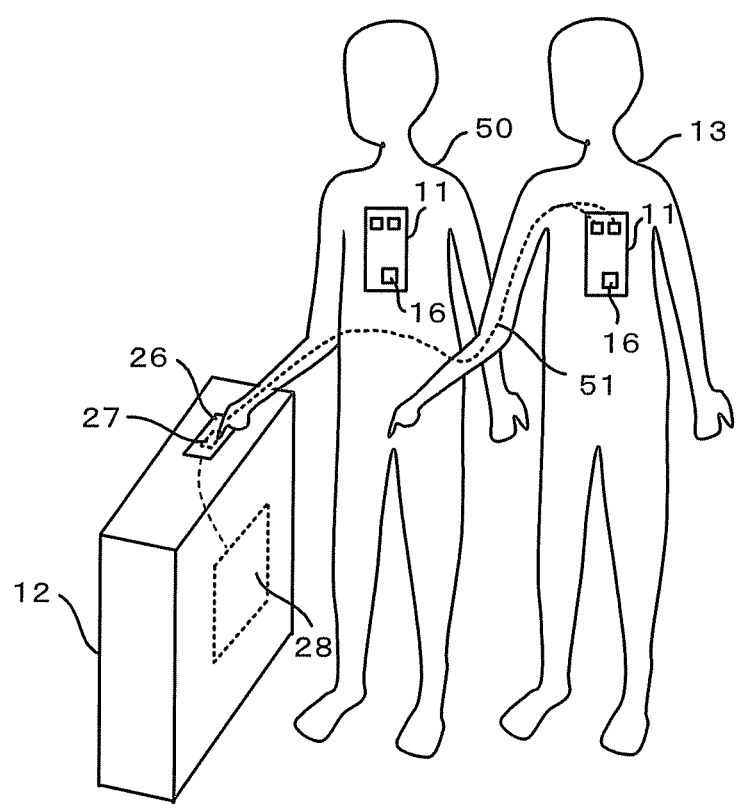

FIGS. 5 to 7 are figures showing cases where there is no correlation between the first and second living body physiological information 31, 32, that is, the carrier 13 does not touch the human body contact sensor 26 and the carrier 13 and the human body contactor are different persons, FIGS. 5 and 6 are figures showing cases where the human body contactor carries no first human body communication terminal, and FIG. 7 is a figure showing a case where the human body contactor carries the first human body communication terminal.

Assume as shown in FIG. 5 that a person 40 (hereinafter, referred to simply as non-carrier 40) carrying no first communication terminal 11 and the carrier 13 are a parent and child hand in hand together. If the non-carrier 40 casually touches the human body contact sensor 26 when passing by the side of the second human body communication terminal 12, a human body communication path 41 reaching the carrier 13 is formed via the non-carrier 40 (human body contactor 40).

In this case, there is no correlation between the first living body physiological information 31 and the second living body physiological information 32 and thus, the communication intension of the carrier 13 is not authenticated. Therefore, unintended data communication of the carrier 13 can be prevented.

Assume as shown in FIG. 6 that a non-carrier 45 pushes in between the second human body communication terminal 12 and the carrier 13 when the carrier 13 stands by the side of the second human body communication terminal 12. If one hand of the non-carrier 45 casually touches the human body contact sensor 26 and the other hand comes into contact with the carrier 13 when the non-carrier 45 slips between the second human body communication terminal 12 and the carrier 13, a human body communication path 46 reaching the carrier 13 is formed via the non-carrier 45 (human body contactor 45).

Also in this case, there is no correlation between the first living body physiological information 31 and the second living body physiological information 32 and thus, the communication intension of the carrier 13 is not authenticated. Therefore, unintended data communication of the carrier 13 can be prevented.

Assume as shown in FIG. 7 that a person 50 (hereinafter, referred to simply as a carrier 50) carrying the same first human body communication terminal 11 pushes in between the second human body communication terminal 12 and the carrier 13 when the carrier 13 stands by the side of the second human body communication terminal 12 and touches the human body contact sensor 26 while coming into contact with the carrier 13.

If the side of the carrier 50 is accidentally closed, a human body communication path 51 reaching the carrier 13 by passing through the lower arm and waist of the carrier 50 (human body contactor 50) may be formed without a communication path reaching the first human body communication terminal 11 carried by the carrier 50 via the upper arm and chest of the carrier 50 being formed.

Also in this case, there is no correlation between the first living body physiological information 31 and the second living body physiological information 32 and thus, the communication intension of the carrier 13 is not authenticated. Therefore, unintended data communication of the carrier 13 can be prevented.

In the first embodiment, as described above, the first human body communication terminal 11 includes the first sensor 16 that detects the first living body physiological information 31 of the carrier 13, the second human body communication terminal 12 includes the second sensor 27 that detects the second living body physiological information 32 of a human body contactor, and an authentication unit checks whether there is any correlation between the first and second living body physiological information 31, 32.

As a result, when there is a correlation between the first and second living body physiological information 31, 32, that the carrier 13 and the human body contactor are one and the same person is verified so that data communication is performed only if the carrier 13 has a communication intention. Therefore, the human body communication apparatus capable of authenticating the communication intention of the person himself carrying a human body communication terminal and the authentication method of the human body communication apparatus are obtained.

Data communication not intended by the person himself carrying a first human body communication terminal is prevented so that security problems are prevented from occurring.

Figure 8:
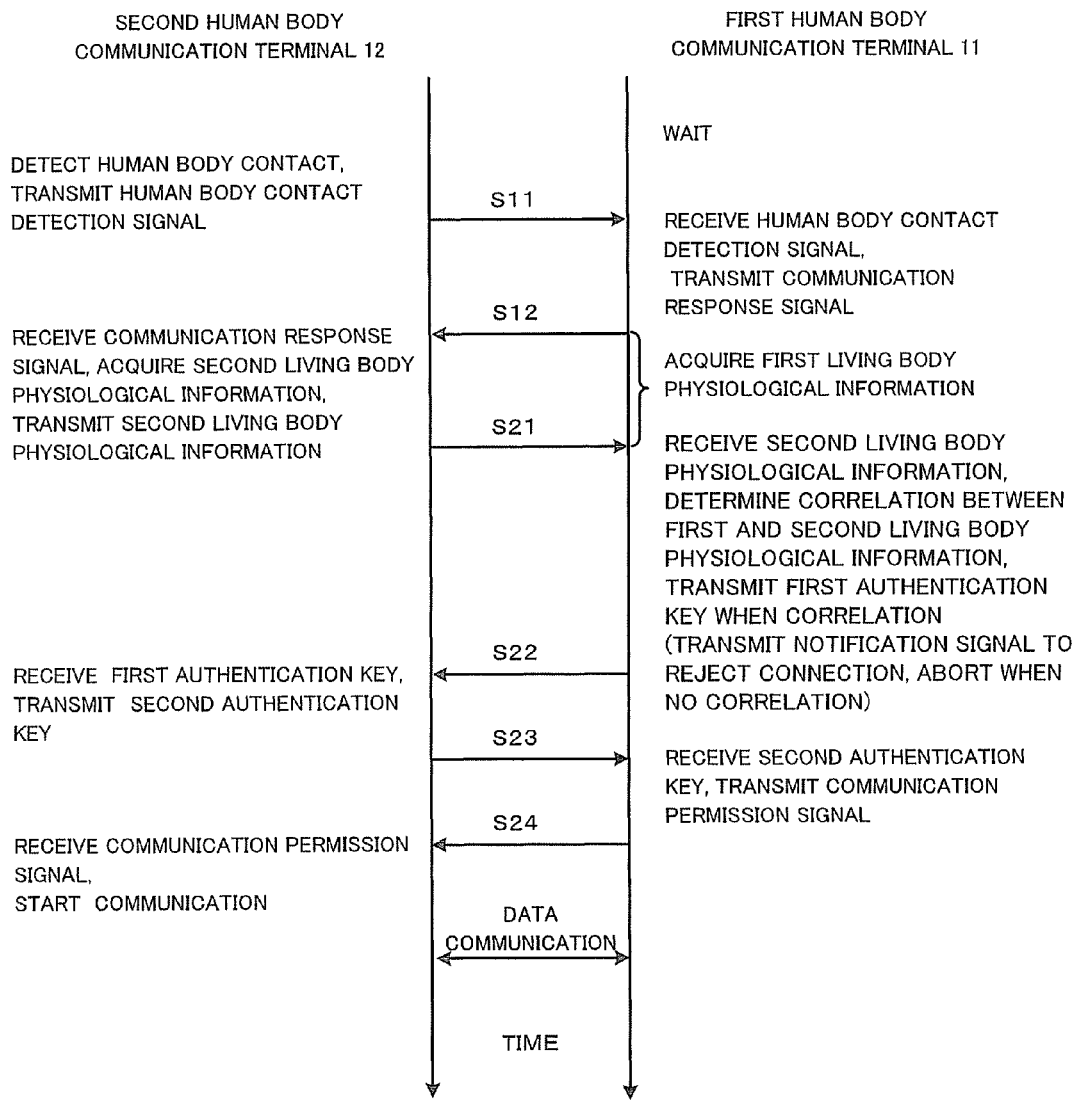
FIG. 8 is a diagram showing another authentication procedure of the human body communication apparatus according to the first embodiment.

While a case where a correlation between the first and second living body physiological information 31, 32 is determined by the second human body communication terminal 12 is described here, the determination may be made by the first human body communication terminal 11. FIG. 8 is a diagram showing an authentication procedure when a correlation between the first and second living body physiological information 31, 32 is determined by the first human body communication terminal 11.

As shown in FIG. 8, steps S11 and S12 are the same as the case where the correlation between the first and second living body physiological information 31, 32 is determined by the second human body communication terminal 12.

When a communication response signal is received, the second human body communication terminal 12 acquires the second living body physiological information 32 and transmits the acquired second living body physiological information 32 (step S21).

When the second living body physiological information 32 is received, the first human body communication terminal 11 determines a correlation between the first living body physiological information 31 and the second living body physiological information 32, judges whether there is any correlation between the first living body physiological information 31 and the second living body physiological information 32, and, if there is a correlation, transmits a first authentication key to exchange authentication keys (step S22).

When the first authentication key is received, the second human body communication terminal 12 transmits a second authentication key (step S23).

When the second authentication key is received, the exchange of the authentication keys is completed and the first human body communication terminal 11 transmits a communication permission signal (step S24).

With the reception of the communication permission signal by the second human body communication terminal 12, the authentication is completed. Hereinafter, data communication can freely be performed between the first and second human body communication terminals 11, 12 through human body communication using the carrier 13 as a communication path.

On the other hand, if there is no correlation between the first living body physiological information 31 and the second living body physiological information 32, the first human body communication terminal 11 transmits a notification signal to reject a connection and interrupts the communication.

While a case where the contact site is the fingertip is described here, a palm may be sufficient as a contact site. In the case of the palm, it is possible that the palm is in contact with the second sensor 27 or is put above the second sensor 27.

(Second Embodiment)

Figure 9:
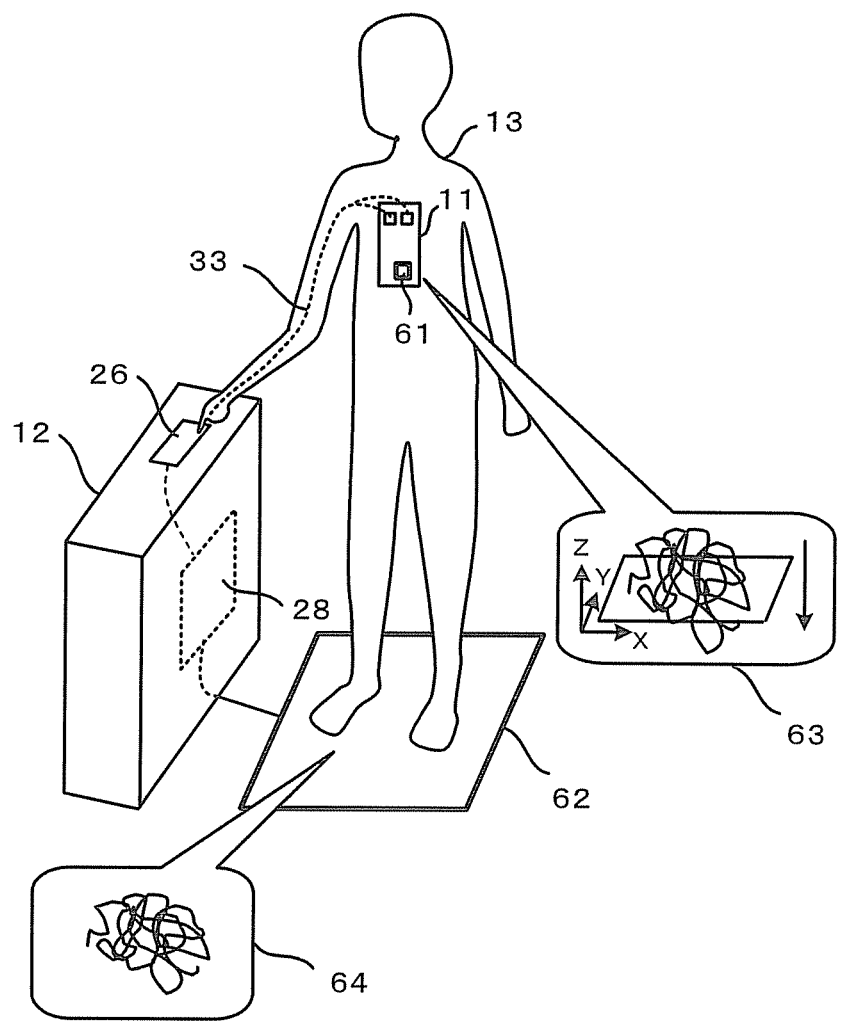
FIG. 9 is a figure for explaining a human body communication apparatus according to a second embodiment.

A second embodiment will be described with reference to FIG. 9. FIG. 9 is a figure for explaining a human body communication apparatus of the second embodiment. In the second embodiment, the same reference numerals are attached to the same structural elements as those in the first embodiment to omit a description of such structural elements and only different portions will be described.

The difference of the second embodiment from the first embodiment is that first and second living body physiological information is assumed to be fluctuations of the center of gravity of a human body. While a human body stands upright, the center of gravity continually fluctuates. If such fluctuations can be detected, the fluctuations can be used as the first and second living body physiological information.

As shown in FIG. 9, in a human body communication apparatus of the second embodiment, the first human body communication terminal 11 contains, as a first sensor (first detection unit) 61, an acceleration sensor to detect fluctuations of a human body, for example, a MEMS (Micro Electro Mechanical Systems) three-axis acceleration sensor.

The second human body communication terminal 12 has, as a second sensor (second detection unit) 62, a sensor mat to read a movement locus of the center of gravity of a human body, for example, a pressure sensitive position sensor externally attached thereto.

Since the orientation in which the terminal is carried cannot be in a fixed direction with respect to the ground, the first sensor 61 determines the direction of gravity simultaneously with movement of the center of gravity. When the direction of gravity is determined, the first sensor 61 acquires first living body physiological information 63 by cutting out only components parallel to the gravity.

The second sensor 62 is laid on the floor where the second human body communication terminal 12 is installed. For example, the carrier 13 instantaneously stops to try to touch the human body contact sensor 26. The first sensor 61 detects the first living body physiological information 63 and the second sensor 62 detects second living body physiological information 64 from fluctuations of the center of gravity of the carrier 13 while the carrier 13 stops.

In this case, there is a correlation between the first living body physiological information 63 and the second living body physiological information 64 and thus, that the carrier 13 touches the human body contact sensor 26, that is, that the carrier 13 and the human body contactor are one and the same person is verified so that the communication intention of the carrier 13 can be authenticated.

On the other hand, in situations shown in FIGS. 5 to 7, there is no correlation between the first living body physiological information 63 of the carrier 13 and the second living body physiological information of the human body contactor, the communication intension of the carrier 13 is not authenticated. Therefore, unintended data communication of the carrier 13 can be prevented.

In the second embodiment, as described above, fluctuations of the center of gravity of a human body are adopted as the first and second living body physiological information 63, 64. Accordingly, the second embodiment can advantageously be applied when it is difficult to apply the method of detecting living body physiological information of a human body, for example, when it is difficult for the first human body communication terminal to feel the vibration of pulsation.

When a mobile device containing an acceleration sensor in advance is modified as a first human body communication terminal, an advantage that no new sensor to detect the vibration due to pulsation of the chest needs to be provided is also obtained.

(Third Embodiment)

Figure 10:
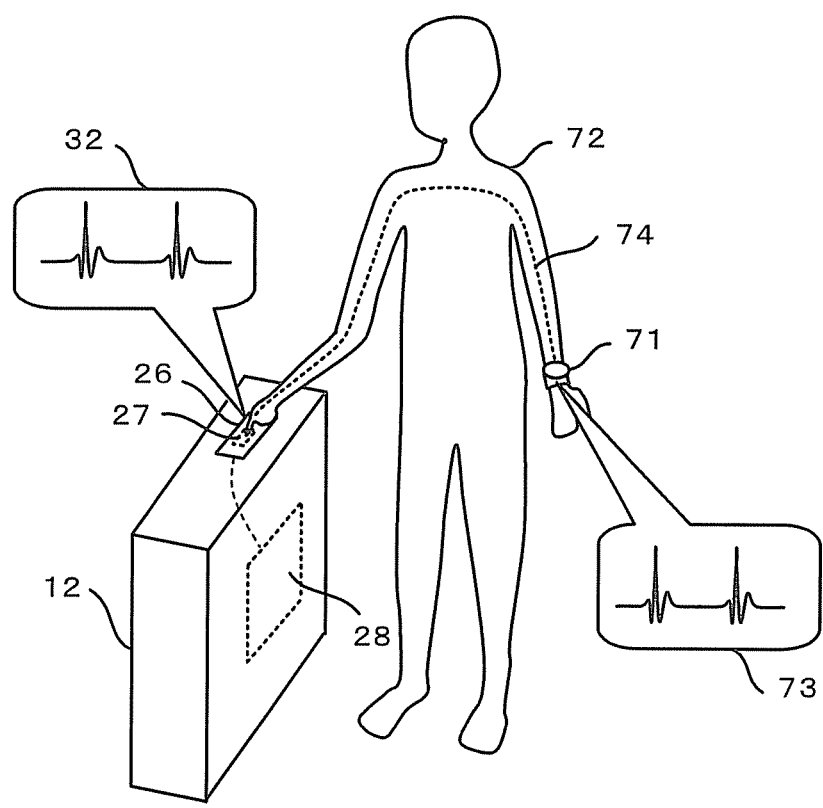
FIG. 10 is a figure for explaining a human body communication apparatus according to a third embodiment.

A third embodiment will be described with reference to FIG. 10. FIG. 10 is a figure for explaining a human body communication apparatus of the third embodiment. In the third embodiment, the same reference numerals are attached to the same structural elements as those in the first embodiment to omit a description of such structural elements and only different portions will be described. The third embodiment is different from the first embodiment in that the first human body communication terminal is a type that can be mounted on a wrist.

As shown in FIG. 10, in a human body communication apparatus of the third embodiment, a first human body communication terminal 71 is a type of human body communication terminal that can be mounted on a wrist. The first human body communication terminal 71 contains a first sensor (not shown) that detects pulsation of a wrist.

The first sensor detects first living body physiological information 73 based on pulsation of a person 72 (hereinafter, referred to simply as a carrier 72) carrying the first human body communication terminal 71. The first human body communication terminal 71 transmits the first living body physiological information 73 to the second human body communication terminal 12 via a human body communication path 74.

In this case, there is a correlation between the first living body physiological information 73 and the second living body physiological information 32 and thus, that the carrier 72 touches the human body contact sensor 26, that is, that the carrier 72 and the human body contactor are one and the same person is verified so that the communication intention of the carrier 72 can be authenticated.

On the other hand, in situations shown in FIGS. 5 to 7, there is no correlation between the first living body physiological information 73 of the carrier 72 and the second living body physiological information of the human body contactor, the communication intension of the carrier 72 is not authenticated. Therefore, unintended data communication of the carrier 72 can be prevented.

Since the artery passes through the wrist near the surface of a human body, detection of the pulsation is reliable and easy. In the first human body communication terminal 11 shown in FIG. 2, detection of the pulsation may be inaccurate depending on the mounting site of a human body.

If the first human body communication terminal 11 is mounted on the chest relatively close to the heart, for example, it is easy to detect the vibration caused by pulsation of a body, but if the first human body communication terminal 11 is mounted on a site where it is difficult to feel the vibration caused by a pulse such as the abdomen, it becomes difficult to accurately detect pulsation.

In the third embodiment, as described above, the first human body communication terminal 71 is of the type to mount on a wrist. Accordingly, an advantage is obtained in that malfunctioning of being incapable of acquiring first living-body-physiological information depending on the mounting site of the first communication terminal 11 is improved.

Further, when compared with the first communication terminal 11, advantages such as being easy to bring the first human body communication terminal 71 into direct contact with a human body and being easy to mount the first human body communication terminal 71 are obtained.

(Fourth Embodiment)

Figure 11:
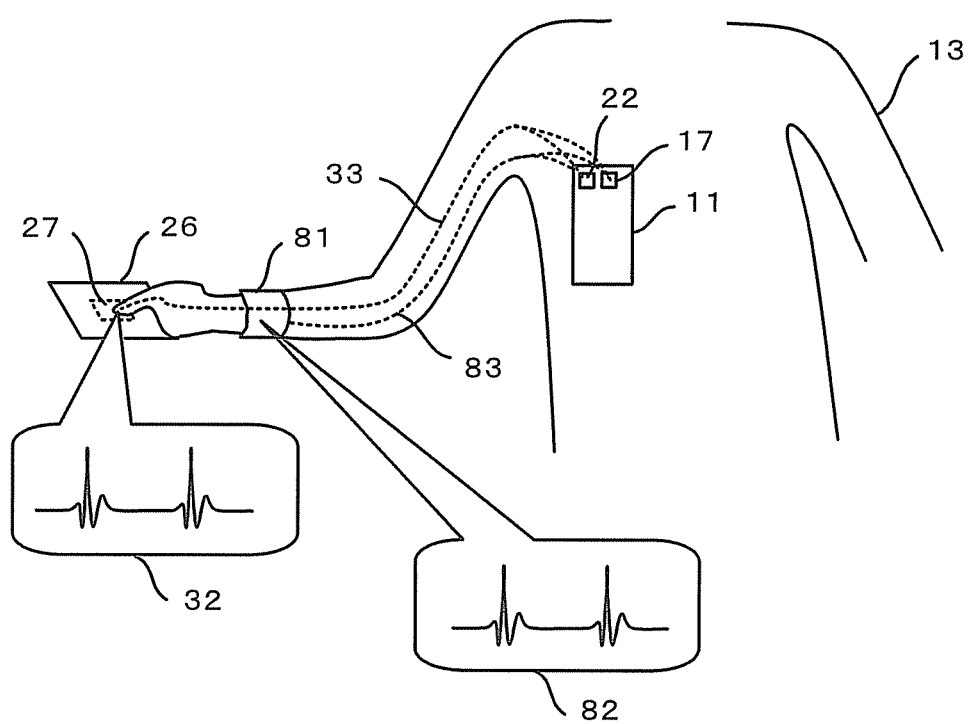
FIG. 11 is a figure for explaining a human body communication apparatus according to a fourth embodiment.

A fourth embodiment will be described with reference to FIG. 11. FIG. 11 is a figure for explaining a human body communication apparatus of the fourth embodiment. In the fourth embodiment, the same reference numerals are attached to the same structural elements as those in the first embodiment to omit a description of such structural elements and only different portions will be described. The fourth embodiment is different from the first embodiment in that a first sensor is externally attached to a first human body communication terminal.

As shown in FIG. 11, in a human body communication apparatus of the fourth embodiment, a first sensor 81 to detect pulsation of a wrist is externally attached to the first human body communication terminal 11. The first sensor 81 is mounted on a wrist of the carrier 13. Communication authentication is provided (paired) to the first human body communication terminal 11 and the first sensor 81 in advance.

The first sensor 81 detects first living body physiological information 82 based on pulsation of the wrist and transmits the first living body physiological information 82 to the first human body communication terminal 11 via a human body communication path 83. The first human body communication terminal 11 transmits the first living body physiological information 82 to the second human body communication terminal 12 via the human body communication path 33.

The first sensor 81 is provided near the second sensor 27 and thus, noise mixed in the first living body physiological information 82 detected by the first sensor 81 from a wrist and the second living body physiological information 32 detected by the second sensor 27 from a fingertip and differences in waveform of fine portions are reduced. As a result, it is expected to increase a correlation between the first and second living body physiological information 82, 32.

In this case, there is a correlation between the first and second living body physiological information 82, 32 and thus, it is verified that the carrier 13 touches the human body contact sensor 26, that is, it is verified that the carrier 13 and the human body contactor are one and the same person. It is possible to authenticate the communication intention of the carrier 13.

On the other hand, in situations shown in FIGS. 5 to 7, there is no correlation between the first living body physiological information 82 of the carrier 13 and the second living body physiological information of the human body contactor, the communication intension of the carrier 13 is not authenticated. Therefore, it is possible to prevent unintended data communication of the carrier 13.

In the fourth embodiment, as described above, the first sensor 81 is externally attached to the first human body communication terminal 11. As a result, an advantage is obtained in that the first sensor 81 can be mounted at a site most appropriate to detect the first living body physiological information 82.

(Fifth Embodiment)

Figure 12:
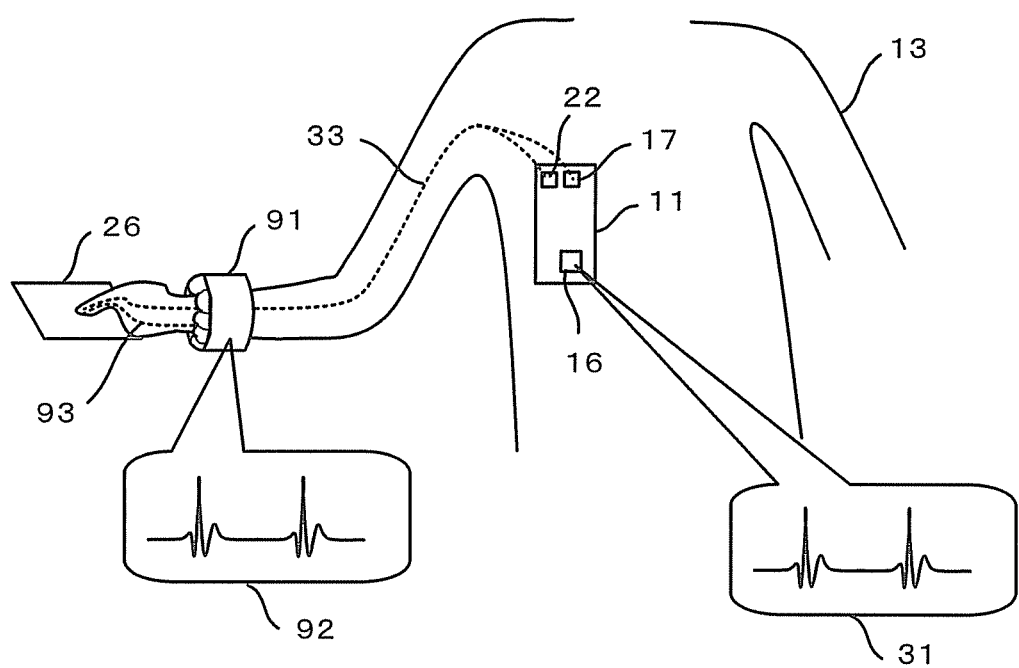
FIG. 12 is a figure for explaining a human body communication apparatus according to a fifth embodiment.

A fifth embodiment will be described with reference to FIG. 12. FIG. 12 is a figure for explaining a human body communication apparatus of according to the fifth embodiment. In the fifth embodiment, the same reference numerals are attached to the same structural elements as those in the first embodiment to omit a description of such structural elements and only different portions will be described. The fifth embodiment is different from the first embodiment in that a second sensor is externally attached to a second human body communication terminal.

As shown in FIG. 12, in a human body communication apparatus of the fifth embodiment, a second sensor 91 to detect pulsation of a wrist is externally attached to the second human body communication terminal 12. The second sensor 91 is mounted on a wrist of a human body contactor, here, the carrier 13.

The second sensor 91 detects second living body physiological information 92 based on pulsation of the wrist and transmits the second living body physiological information 92 to the second human body communication terminal 12 via a human body communication path 93.

The second sensor 91 has a structure similar to an arm-in type sphygmomanometer, for example, and when an arm is passed through an arm cylinder whose inner side is movable and brought into contact with the human body contact sensor 26, an air bag of the arm cylinder is automatically swollen so that the second sensor 91 is closely mounted on the wrist.

When the second living body physiological information 92 is detected, the air bag of the arm cylinder is automatically contracted so that the second sensor 91 is unmounted. Though it takes time to mount/unmount the second sensor 91, mounting/unmounting is automatic so that a human body contactor is less likely to undergo stress.

The second living body physiological information 92 detected by the second sensor 91 from a wrist is more reliable than second living body physiological information detected from a fingertip and it is expected to increase a correlation between the first and second living body physiological information 31, 92.

In this case, there is a correlation between the first living body physiological information 31 and the second living body physiological information 92 and thus, it is verified that the carrier 13 touches the human body contact sensor 26, that is, it is verified that the carrier 13 and the human body contactor are one and the same person. It is possible to authenticate the communication intention of the carrier 13.

On the other hand, in situations shown in FIGS. 5 to 7, there is no correlation between the first living body physiological information 31 of the carrier 13 and the second living body physiological information 92 of the human body contactor, and the communication intension of the carrier 13 is not authenticated. Therefore, it is possible to prevent unintended data communication of the carrier 13.

In the fifth embodiment, as described above, the second sensor 91 is externally attached to the second human body communication terminal 12. As a result, an advantage is obtained in that the second living body physiological information 92 can be detected from a wrist which is more reliable than a fingertip.

(Sixth Embodiment)

Figure 13:
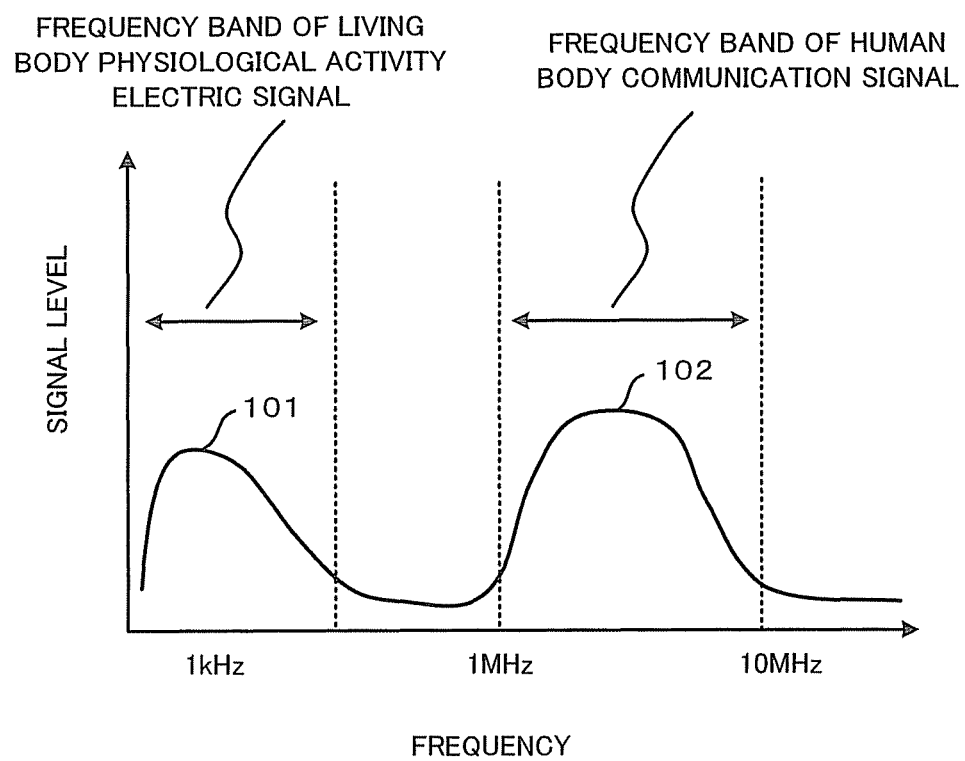
FIG. 13 is a figure for explaining a human body communication apparatus according to a sixth embodiment.
Figure 14:
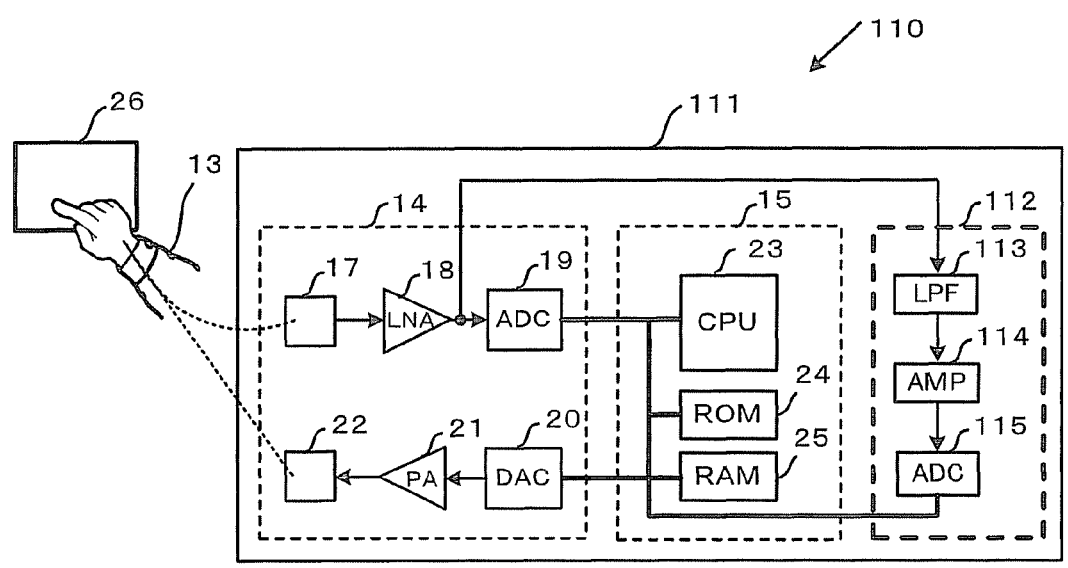
FIG. 14 is a block diagram showing the human body communication apparatus according to the sixth embodiment.

A sixth embodiment will be described with reference to FIGS. 13 and 14. FIG. 13 is a figure for explaining a human body communication apparatus of the sixth embodiment and FIG. 14 is a block diagram showing the human body communication apparatus. In the sixth embodiment, the same reference numerals are attached to the same structural elements as those in the first embodiment to omit a description of such structural elements and only different portions will be described. The sixth embodiment is different from the first embodiment in that an electric signal emitted owing to a living body physiological activity of a human body is adopted as living body physiological information.

To begin with, an electric signal emitted owing to a living body physiological activity of a human body (referred to as a living body physiological activity electric signal), for example, an electric signal caused by a neural activity, an electric signal due to changes in human body resistance caused by the flow of blood/lymph, and an electric signal generated by changes of interaction with an external electric field or electromagnetic field flows in the human body. The living body physiological activity electric signal is different depending on an active state of a human body and thus can be used as an authentication signal to identify the human body.

As shown in FIG. 13, a living body physiological activity electric signal 101 is distributed substantially in the range of 1 kHz to 1 MHz. On the other hand, a human body communication signal 102 is distributed substantially in a frequency band of 1 MHz to 10 MHz and thus, the living body physiological activity electric signal 101 and the human body communication signal 102 will not interfere with each other.

Therefore, the living body physiological activity electric signal 101 is selected from human body electric signals containing the living body physiological activity electric signal 101 and the human body communication signal 102, the living body physiological activity electric signal 101 can be used as first and second living body physiological information.

As shown in FIG. 14, in a human body communication apparatus 110, a first human body communication terminal 111 is provided with a first detection unit 112 to select the living body physiological activity electric signal 101 from human body electric signals.

In the first human body communication terminal 111, a human body electric signal received by the receiving electrode 17 is amplified by the low-noise amplifier 18. The amplified human body electric signal is input into the AD converter 19 and the first detection unit 112.

In the first detection unit 112, a low-pass filter (select circuit) 113 allows only the living body physiological activity electric signal 101 from the human body electric signal amplified by the low-noise amplifier 18 to pass.

An amplifier 114 amplifies the living body physiological activity electric signal 101 that has passed through the low-pass filter 113. The amplification is intended to compensate for insertion losses of the low-pass filter 113. An AD converter 115 converts the amplified living body physiological activity electric signal 101 into a digital signal and outputs the digital signal to the CPU 23 of the signal processing unit 15.

Similarly, a second human body communication terminal (not shown) is provided with a second detection unit to select the living body physiological activity electric signal 101 from a human body electric signal of a human body contactor. The configuration of the second detection unit is the same as that of the first detection unit and thus, a description of the second detection unit is omitted.

The living body physiological activity electric signal 101 is selected when first and second living body physiological information is acquired by following the flow shown in FIG. 3. The selected living body physiological activity electric signal 101 is AD-converted and fetched by the CPU 23 as a digital signal for processing.

The first detection unit 112 of the first human body communication terminal 111 selects the living body physiological activity electric signal 101 of the carrier 13. The second detection unit of the second human body communication terminal selects the living body physiological activity electric signal 101 of the carrier 13.

In this case, there is a correlation between the first living body physiological information and the second living body physiological information and thus, that the carrier 13 touches the human body contact sensor 26, that is, that the carrier 13 and the human body contactor are one and the same person is verified so that the communication intention of the carrier 13 can be authenticated.

On the other hand, in situations shown in FIGS. 5 to 7, there is no correlation between the first living body physiological information 31 of the carrier 13 and the second living body physiological information of the human body contactor, the communication intension of the carrier 13 is not authenticated. Therefore, it is possible to prevent unintended data communication of the carrier 13.

The human body communication apparatus 110 uses the living body physiological activity electric signal 101 emitted owing to a living body physiological activity of a human body and thus, the first sensor 16 and the second sensor 27 shown in the first embodiment are not needed.

In the sixth embodiment, as described above, the living body physiological activity electric signal 101 is used as the first and second living body physiological information and thus, the first and second sensors are not needed. The first detection unit 112 can be formed integrally in the analog front-end unit 14 or the signal processing unit 15 as a chip and thus, an advantage is obtained in that the first and second human body communication terminals can be simplified and miniaturized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A human body communication apparatus, comprising:
a first human body communication terminal carried by a person and including a first detection unit to detect first living body physiological information of the carrying person;
a second human body communication terminal including a human body contact sensor and a second detection unit to detect second living body physiological information of the person who touches the human body contact sensor; and
an authentication unit included in the first or second human body communication terminal, acquiring the first and second living body physiological information, and determining a correlation between the first and second living body physiological information to permit communication between the first and second human body communication terminals in accordance with the correlation.

2. The human body communication apparatus according to claim 1, wherein the first and second living body physiological information are pulsation of a human body, the first detection unit includes a first sensor that converts the pulsation of the human body into an electric signal, and the second detection unit includes a second sensor that converts the pulsation of the human body into the electric signal.

3. The human body communication apparatus according to claim 2, wherein the first communication terminal is mounted on a chest or a wrist of the carrying person.

4. The human body communication apparatus according to claim 2, wherein the first sensor is externally attached to the first human body communication terminal and connected to the first human body communication terminal through human body communication using the person carrying the first sensor as a communication path.

5. The human body communication apparatus according to claim 2, wherein the second sensor is externally attached to the second human body communication terminal and connected to the second human body communication terminal through human body communication using the person in contact with the human body contact sensor as a communication path.

6. The human body communication apparatus according to claim 2, wherein the second sensor is a sensor that detects the second living body physiological information from a body site excluding a fingertip.

7. The human body communication apparatus according to claim 1, wherein the first and second living body physiological information are fluctuations of a center of gravity of a human body, the first detection unit includes a first sensor that converts the fluctuations of the center of gravity of the human body into an electric signal, and the second detection unit includes a second sensor that converts the fluctuations of the center of gravity of the human body into the electric signal.

8. The human body communication apparatus according to claim 7, wherein the first sensor has a three-axis acceleration sensor, determines a direction of the gravity simultaneously with movement of the center of gravity, and acquires the first living body physiological information by cutting out only components parallel to the gravity.

9. The human body communication apparatus according to claim 7, wherein the second sensor is a pressure sensitive position sensor mat externally attached to the second human body communication terminal.

10. The human body communication apparatus according to claim 6, wherein the first sensor is externally attached to the first human body communication terminal and connected to the first human body communication terminal through human body communication using the person carrying the first sensor as a communication path.

11. The human body communication apparatus according to claim 1, wherein the first and second living body physiological information are an electric signal emitted from a human body owing to a living body physiological activity and the first and second detection units include a select circuit to select the electric signal.

12. The human body communication apparatus according to claim 11, wherein a human body communication signal used for human body communication has a frequency band that is different from the frequency band of the electric signal and the select circuit is a filter that allows only the electric signal to pass.

13. The human body communication apparatus according to claim 12, wherein the human body communication signal has the frequency band that is higher than the frequency band of the electric signal and the filter is a low-pass filter.

14. An authentication method of a human body communication apparatus for authenticating a communication intention of a person carrying a first human body communication terminal in the human body communication apparatus that performs human body communication between the first human body communication terminal carried by the person and a second human body communication terminal, comprising:
  detecting first living body physiological information of the person carrying the first human body communication terminal;
  detecting second living body physiological information of the person in contact with the second human body communication terminal; and
  determining a correlation between the first and second living body physiological information to permit communication between the first and second human body communication terminals in accordance with the correlation.

15. The authentication method of the human body communication apparatus according to claim 14, wherein the first and second living body physiological information are pulsation of a human body, fluctuations of a center of gravity of the human body, or an electric signal emitted from the human body owing to a living body physiological activity.

16. The authentication method of the human body communication apparatus according to claim 14, wherein the correlation between the first living body physiological information and the second living body physiological information is determined by searching for a point as a synchronization point of the first and second living body physiological information where a magnitude of waveform shifts at each sampling point is at a minimum as a whole by comparing both waveforms while gradually shifting a time axis of the waveforms.

17. The authentication method of the human body communication apparatus according to claim 16, wherein the point at the minimum is a point where a sum of squares of a waveform difference between the first and second living body physiological information at each sampling point is at the minimum.

18. A human body communication apparatus, comprising:
  a first human body communication terminal carried by a person and including a first detection unit to detect first living body physiological information of the carrying person;
  a second human body communication terminal including a human body contact sensor and a second detection unit to detect second living body physiological information of the person who touches the human body contact sensor; and
  an authentication unit included in the first or second human body communication terminal, acquiring the first and second living body physiological information, and determining a correlation between the first and second living body physiological information to permit communication between the first and second human body communication terminals between the first and second human body communication terminals when the first living body physiological information is the same as the second living body physiological information and not permit the communication when the first living body physiological information differs from the second living body physiological information.

19. An authentication method of a human body communication apparatus for authenticating a communication intention of a person carrying a first human body communication terminal in the human body communication apparatus that performs human body communication between the first human body communication terminal carried by the person and a second human body communication terminal, comprising:
  detecting first living body physiological information of the person carrying the first human body communication terminal;
  detecting second living body physiological information of the person in contact with the second human body communication terminal; and
  determining a correlation between the first and second living body physiological information to permit communication between the first and second human body communication terminals when the first living body physiological information is the same as the second living body physiological information and not permit the communication when the first living body physiological information differs from the second living body physiological information.

* * * * *